Sept. 18, 1951  W. R. THOMSON  2,568,420

FILTER APPARATUS

Filed March 6, 1947

INVENTOR.
William Robert Thomson
BY Alex. E. MacRae
Attorney.

Patented Sept. 18, 1951

2,568,420

UNITED STATES PATENT OFFICE 2,568,420

FILTER APPARATUS

William Robert Thomson, Ottawa, Ontario, Canada

Application March 6, 1947, Serial No. 732,678

3 Claims. (Cl. 210—197)

This invention relates to the extraction of liquid from materials containing solids in suspension, such as sludges, slurries, pulp and the like.

Difficulty is frequently experienced in achieving an efficient separation of liquid from such materials. When a rotary type of filter is employed, the period of extraction is usually brief and high degrees of vacuum are imposed. Clogging of the filter media frequently occurs, especially when materials containing finely divided solids are under treatment. When a horizontal type of filter is employed with a high degree of vacuum, excessive wear takes place between the contacting surfaces of the filter mat and the supporting frame, and clogging of the filter media in the initial stages of the operation often results. If a vacuum of sufficiently low degree to substantially reduce clogging is employed, separation of liquid is not usually effective.

In my prior Patent No. 2,101,109, issued December 7, 1937, there is disclosed a horizontal type of filter apparatus wherein more effective filtration and operation is proposed.

It is an object of the present invention to provide a filter apparatus somewhat similar to that disclosed in the aforementioned patent but including, in combination therewith, a rotary type of filter apparatus adapted further to promote efficient operation. It is another object to provide a method of separating liquid from solids-containing materials wherein varying degrees of vacuum are imposed on the materials in successive stages of operation in order to obtain improved separation.

Figure 1:
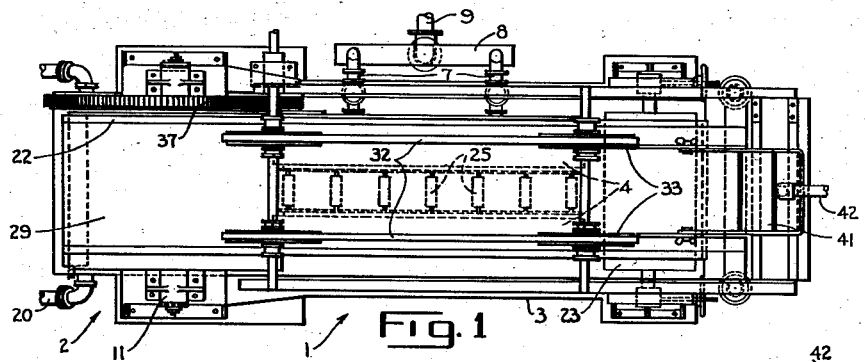
Figure 2:
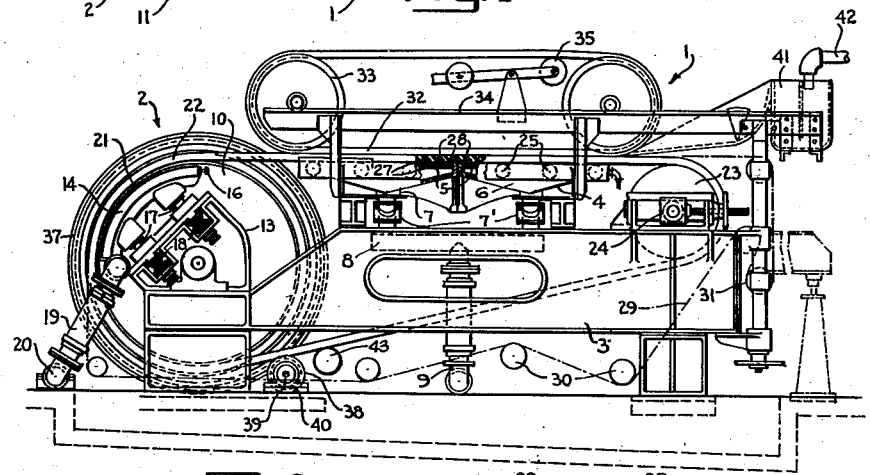
Figure 3:
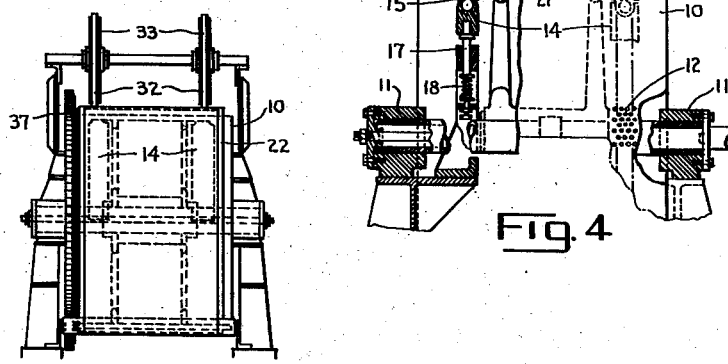
Figure 4:
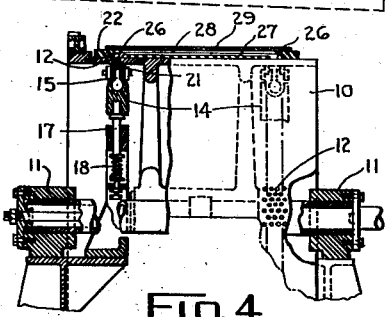

The invention will be described with reference to the accompanying drawing, in which, Figure 1 is a plan view of the apparatus in accordance with the invention, Figure 2 is a side elevation, Figure 3 is an end elevation, and Figure 4 is a partial transverse sectional view of the rotary filter device.

The apparatus, as shown, includes a horizontal type of filter device 1, somewhat similar to that shown in the aforementioned patent, and a rotary type of filter device 2, both being mounted in a suitable frame 3.

The device 1 comprises two transversely spaced series of adjoining suction boxes 4 having horizontally disposed perforated top members 5 and hopper-shaped bottom members 6. The boxes are connected to a source of vacuum through pipes 7 leading to a common header 8 and pipe 9. Vacuum to each box may be independently controlled by means 7'.

The rotary device 2 comprises a head roll 10 supported in suitable bearings 11 in tangential and slightly forwardly spaced relation to upper surfaces of the horizontal members 5. The roll 10 is provided with two transversely spaced annular perforated areas 12 in longitudinal alignment with the horizontal perforated members 5. As clearly shown in Figure 4, the annular imperforate area of the roll 10 between the perforated areas 12 occupies the major portion of the width of the roll. Mounted on support stands 13 within the roll are a pair of arcuate suction boxes 14 each having an arcuate opening 15 in communication with a respective perforated area 12. Means 16 for applying a water seal and lubrication to the contacting surfaces of the boxes 14 and the roll are provided, a flexible deckle seal 21 being also provided. It will be noted that boxes 14 extend forwardly through an arc of approximately 90° from the upper level of the roll. However, it will be apparent that the boxes may extend through a greater or less arcuate degree and that, if desired, each box 14 may be replaced by a plurality of boxes. The boxes are resiliently mounted on gudgeons 17 carried by the spring devices 18, and are connected to a source of vacuum by means of the hose connections 19 and pipes 20.

An endless suction mat 22 of rubber or like flexible material is mounted on the head roll 10 and a tail roll 23. The tail roll is mounted in adjustable take-up bearings 24. It will be observed that the marginal areas of the upper travelling portion of the mat contacts the horizontal members 5 and is supported therebetween by means of table rolls 25. A support roll 43 for the lower travelling portion of the mat may be provided.

The mat is provided with a plurality of openings 28 on its upper surface each communicating with a passage 27 extending transversely through the mat. Each of the passages 27 communicates with a pair of openings 26 in the lower surface of the mat, one of such openings 26 leading from each end of the passages 27 adjacent the marginal portions of the mat. Openings 26 communicate and register with the openings or perforations in the members 5 and areas 12. As clearly shown in Figure 4, the surface of the mat engaging the imperforate section of the roll 10 between the perforated areas 12 is also imperforate.

An endless filter media or screen 29 extends over and in contact with the upper and downward travelling portions of the mat, i. e., the portions thereof adapted to be subjected to suction, the return portion thereof being supported on a series of rolls 30. A take-up supporting roll 31 is also provided.

Deckles 32, adapted to travel with the upper portions of the filter media and mat are provided at either side thereof. The deckles are mounted on pulleys 33 carried by support rails 34. The upper portions of the deckles may be supported and placed under tension by means of pulleys 35.

The head roll 10, with the mat and filter media, are driven by means of a large gear 37 mounted for rotation with the head roll and a small gear 38 fixed to drive shaft 39 suitably mounted in bearings 40.

A head box 41, mounted on the rearward end of the frame and fed by a delivery pipe 42, is adapted to feed the material to be treated onto the rearward or receiving end of the horizontally travelling portion of the filter media and mat.

The general operation of the apparatus will be apparent from the foregoing description, the material under treatment being subjected to vacuum as it travels horizontally with the filter media and mat over the suction boxes 4 and downwardly over the suction boxes 14, to remove the liquid contents therefrom. If necessary or desirable, the material, especially if it contains a relatively high proportion of liquid, may be subjected to a preliminary drainage step before delivery onto the mat. An important feature of the invention resides, however, in the combination, with a horizontal type of filter device, of a rotary type of filter means wherein substantially no wear on the mat takes place regardless of the degree of vacuum applied, because the mat travels in synchronism with the rotary filter roll 10.

In accordance with the invention, a relatively low degree of vacuum is applied to the boxes 4, whereby the frictional contact between the mat and the cooperating surfaces of the boxes is subject to light pressure and consequent reduced wear and whereby the tendency to clog the filter media by the fines in the material is considerably reduced during this initial stage of treatment. A relatively high degree of vacuum is applied to the suction boxes 14, wherein there is substantially little frictional wear between the mat and roll and wherein, because of the loosely packed condition of the filter cake following its prolonged treatment under low vacuum, an effective removal of liquid takes place during this relatively brief and final stage of treatment.

It will be appreciated that the degree of vacuum applied to the boxes 4 and 14 will vary greatly with different types of material under treatment. For instance, in the treatment of sewage, the vacuum range on the horizontal deck might be from 10" to 16" of mercury, while on the roll the range may be 20" to 26" of mercury. Generally speaking, the vacuum applied on the horizontal deck will not exceed 16" of mercury and that applied to the roll will not exceed 30". Moreover the vacuum applied to the individual horizontal boxes may vary. This, a progressively increasing degree of vacuum from, say 6" of mercury to 16" of mercury, from the first to the last pair of boxes in the series may be provided.

The apparatus and method described make possible a considerably more effective separation of liquid from slurries, sludges and the like. A horizontal type of filter is desirable in order to provide a convenient and prolonged treatment of the material. If, however, a high degree of vacuum is applied to a horizontally travelling mat, the wear thereon is generally quite marked and the treatment during its final stages is of little effect due to the clogging of the filter media. On the other hand, if a vacuum of sufficiently low degree is employed to reduce wear and prevent clogging, the removal of liquid is not usually completely effective.

I claim:

1. In apparatus of the character described, a stationary member having suction passages therein and a substantially flat horizontally disposed upper surface, said surface having a plurality of openings therein in communication with said passages, a roll rotatably mounted forwardly of said member about a horizontal axis and having an annular perforated section adjacent each end thereof and occupying a minor portion of the width of the roll, the section of the roll between said perforated sections being imperforate and extending throughout the major width of the roll, a suction box stationarily mounted within the roll adjacent each end thereof and having an inlet in contact with a portion of a respective perforated section to provide communication between the perforations of said section and the box, an endless suction mat extending over and in contact with said upper surface of the stationary member and the surface of the roll, said mat having a plurality of passages extending transversely therethrough and openings leading from each end of the passages adjacent the marginal portions of the mat and communicating with the openings in said upper surface and the perforations in said perforated sections, the surface of the mat engaging the imperforate section of the roll being imperforate, means for applying vacuum independently to the suction passages in the stationary member and to the suction box, an endless screen extending over and in contact with the portions of the mat in contact with the stationary member and roll, means for delivering material to be filtered onto the rearward end of said screen and suction mat, and means for driving the roll to cause the screen and suction mat to travel over said upper surface of the stationary member and in synchronism with the roll.

2. In apparatus of the character described, a stationary member having suction passages therein and a substantially flat horizontally disposed perforated upper surface, the perforations in said upper surface being in comunication with said passages, a roll rotatably mounted forwardly of said member about a horizontal axis and having an annular perforated section adjacent each end thereof and occupying a minor portion of the width of the roll, the section of the roll between said perforated sections being imperforate and extending throughout the major width of the roll, the upper surface of said roll being disposed in a plane substantially coincident with the plane of said upper surface of the stationary member, a suction box stationarily mounted within the roll adjacent each end thereof and having an inlet in contact with a portion of a respective perforated section to provide communication between the perforations of said section and the box, the area of said inlet being considerably smaller than the area of said upper perforated surface of the stationary member, an endless suction mat extending over and in contact with said upper surface of the stationary member and the surface of the roll, said mat having a plurality of passages extending transversely therethrough and openings leading from each end of the passages adjacent the marginal portions of the mat and communicating with the perforations in said upper surface of the stationary member and in said roll, the surface of the mat engaging the imperforate section of the roll being imperforate, means for applying vacuum independently to the suction passages in the stationary member and to the suction box, an endless screen extending over and in contact with the portions of the mat in contact with the stationary member and roll, means for delivering material to be filtered onto the rearward end of said screen and suction mat, and means for driving the roll to cause the screen and suction mat to travel over said upper surface of the stationary member and in synchronism with the roll.

3. In apparatus of the character described, two laterally aligned series of suction boxes each having horizontally disposed suction areas, a roll rotatably mounted forwardly of said boxes and having two annular perforated areas each adjacent a respective end of the roll and in longitudinal alignment with the suction areas of a respective series of said boxes, the annular area of said roll between the perforated areas being imperforate and occupying the major portion of the width of the roll, arcuate suction boxes stationarily mounted within said roll and each having an inlet in communication with a portion of one of said annular suction areas, an endless filter mat extending over said roll and suction boxes, said mat having a plurality of passages extending transversely therethrough and openings leading from each end of the passages adjacent the marginal portions of the mat and communicating with all of said suction areas, the surface of the mat engaging the imperforate section of the roll being imperforate, means for applying vacuum to all of said aligned series of suction boxes, independent means for applying vacuum to said arcuate suction boxes, and means for driving said roll.

WILLIAM ROBERT THOMSON.

REFERENCES CITED

The following references are of record in the file of this patent:

UNITED STATES PATENTS

| Number | Name | Date |
|---|---|---|
| 2,101,042 | Casey | Dec. 7, 1937 |
| 2,101,109 | Thomson | Dec. 7, 1937 |
| 2,222,469 | Youngschild | Nov. 19, 1940 |
| 2,369,653 | Berry et al. | Feb. 20, 1945 |
| 2,369,674 | Hornbostel | Feb. 20, 1945 |
| 2,377,123 | Ballamy et al. | May 29, 1945 |
| 2,445,416 | Baker et al. | July 20, 1948 |